United States Patent [19]

Meyer et al.

[11] Patent Number: 4,643,701

[45] Date of Patent: Feb. 17, 1987

[54] SPROCKET AND TAPE COMBINATION

[75] Inventors: Lawrence L. Meyer, Canton; Donald H. Bredbeck, Louisville, both of Ohio

[73] Assignee: Phillips Home Products, Akron, Ohio

[21] Appl. No.: 772,567

[22] Filed: Sep. 4, 1985

[51] Int. Cl.⁴ .............................................. F16H 7/02
[52] U.S. Cl. ..................................... 474/153; 474/205
[58] Field of Search ............... 474/153, 152, 174, 184, 474/202, 204, 205; 198/834; 49/28, 199

[56] References Cited

U.S. PATENT DOCUMENTS

| | | | |
|---|---|---|---|
| 239,114 | 3/1881 | Reese | 474/205 X |
| 3,120,409 | 2/1964 | Beall | 474/153 X |
| 3,252,503 | 5/1966 | Jackson | 49/28 |
| 3,577,794 | 5/1971 | Kerfoot, Jr. | 474/204 |
| 3,642,120 | 2/1972 | Duhan | 474/153 X |
| 4,414,778 | 11/1983 | Carli | 49/199 |
| 4,520,684 | 6/1985 | Meyer et al. | 474/205 X |

*Primary Examiner*—Stephen J. Novosad
*Assistant Examiner*—Thuy M. Bui
*Attorney, Agent, or Firm*—Pearne, Gordon, McCoy & Granger

[57] ABSTRACT

A sprocket and flexible tape combination is disclosed wherein the tape has a thickness which is a relatively large fraction of the radius of the sprocket so that the tape is relatively stiff. The tape has web areas between longitudinally adjacent apertures and has connecting areas laterally adjacent each aperture connecting longitudinally adjacent web areas. These connecting areas of the tape engage engagement shoulders which are disposed around the periphery of the sprocket and these engagement shoulders alternate with sprocket surfaces around the periphery. All of the engagement shoulders have the same radius from the axis and a sprocket tooth is mounted on each of the engagement shoulders to engage a respective aperture in the tape. As the tape is wrapped around the part of the periphery of the sprocket, it engages the engagement shoulders laterally adjacent the respective tooth, and the sprocket surfaces are positioned radially inwardly from the imaginary circle from the axis through the engagement shoulders, and this establishes the tape as being bent more at the connecting areas than at the web areas. This assures full engagement of each tooth with the surface defining the aperture so that the tape does not tend to radially move away from the tooth; instead, there is good tooth-to-tape aperture engagement. The foregoing abstract is merely a resume of one general application, is not a complete discussion of all principles of operation or applications, and is not to be construed as a limitation on the scope of the claimed subject matter.

15 Claims, 6 Drawing Figures

SPROCKET AND TAPE COMBINATION

BACKGROUND OF THE INVENTION

A drive sprocket and flexible tape combination has previously been disclosed in a number of prior patents. A steel belt with apertures to receive teeth on a sprocket has been disclosed in U.S. Pat. No. 239,114 and a laminated belt of plastic with apertures to receive the sprocket teeth has been disclosed in U.S. Pat. No. 3,577,794. Plastic belts with apertures therein have been suggested for use in closure operators, such as garage door operators, in U.S. Pat. Nos. 3,252,503 and 4,414,778. Further, such a tape has been disclosed in U.S. Pat. No. 4,520,684.

For over one hundred years, such sprockets have had a circular periphery under the assumption that the tape was capable of deforming to a circular arc and wrapping around a part of such periphery. In the latter patent, there was disclosed a plastic tape which was sufficiently stiff that it could transmit compression as well as tension forces so long as it was guided in a longitudinal channel. However, it has been discovered that the tape is more flexible at each aperture than it is in the areas between apertures. This means that in wrapping around the sprocket, the tape tends to bend more at the connecting areas laterally adjacent the apertures than at the web areas, which are those portions between longitudinally adjacent apertures. This has been found to cause the tape to tend to work its way radially off the sprocket teeth under load on the tape, and to cause the tape to be worn at the apertures.

SUMMARY OF THE INVENTION

The problem to be solved, therefore, is how to construct a sprocket and tape combination wherein the tape will stay in engagement with the teeth of the sprocket and not be forced under load away from the surface of the sprocket.

This problem is solved by a sprocket and flexible tape combination comprising said tape having a series of apertures into the thickness thereof from the inner surface thereof and aligned along the length thereof, said tape having web areas between longitudinally adjacent apertures and having at least one connecting area laterally adjacent each aperture connecting longitudinally adjacent web areas, said sprocket having a given plurality of engagement shoulders around the periphery adapted to engage said tape connecting areas, sprocket surfaces equal in number to said plurality of engagement shoulders and alternating with said engagement shoulders around the periphery of said sprocket, said sprocket having a given radius from the axis thereof to said given plurality of engagement shoulders, a generally radially extending tooth mounted on each engagement shoulder and adapted to engage respective apertures in the flexible tape, said tape adapted to wrap around a part of the periphery of the sprocket to engage a plurality of said teeth, and said given plurality of sprocket surfaces established in a position radially inwardly from the circular arc of said engagement shoulders from said axis to establish said tape as bent more at said connecting areas than at said web areas.

Accordingly, an object of the invention is to provide a sprocket and flexible tape combination with good drive engagement between the sprocket teeth and the tape.

Another object of the invention is to provide a sprocket and tape combination wherein the component of force transmitted by the sprocket teeth to the tape is as nearly longitudinally along a length of the tape as possible.

A further object of the invention is to provide a sprocket and flexible tape combination wherein the sprocket has a general polygonal configuration so that the tape is permitted to bend more adjacent the apertures than at the web areas between longitudinally adjacent areas.

Other objects and a fuller understanding of the invention may be had by referring to the following description and claims, taken in conjunction with the accompanying drawing.

DESCRIPTION OF THE PREFERRED EMBODIMENTS

Figure 1:
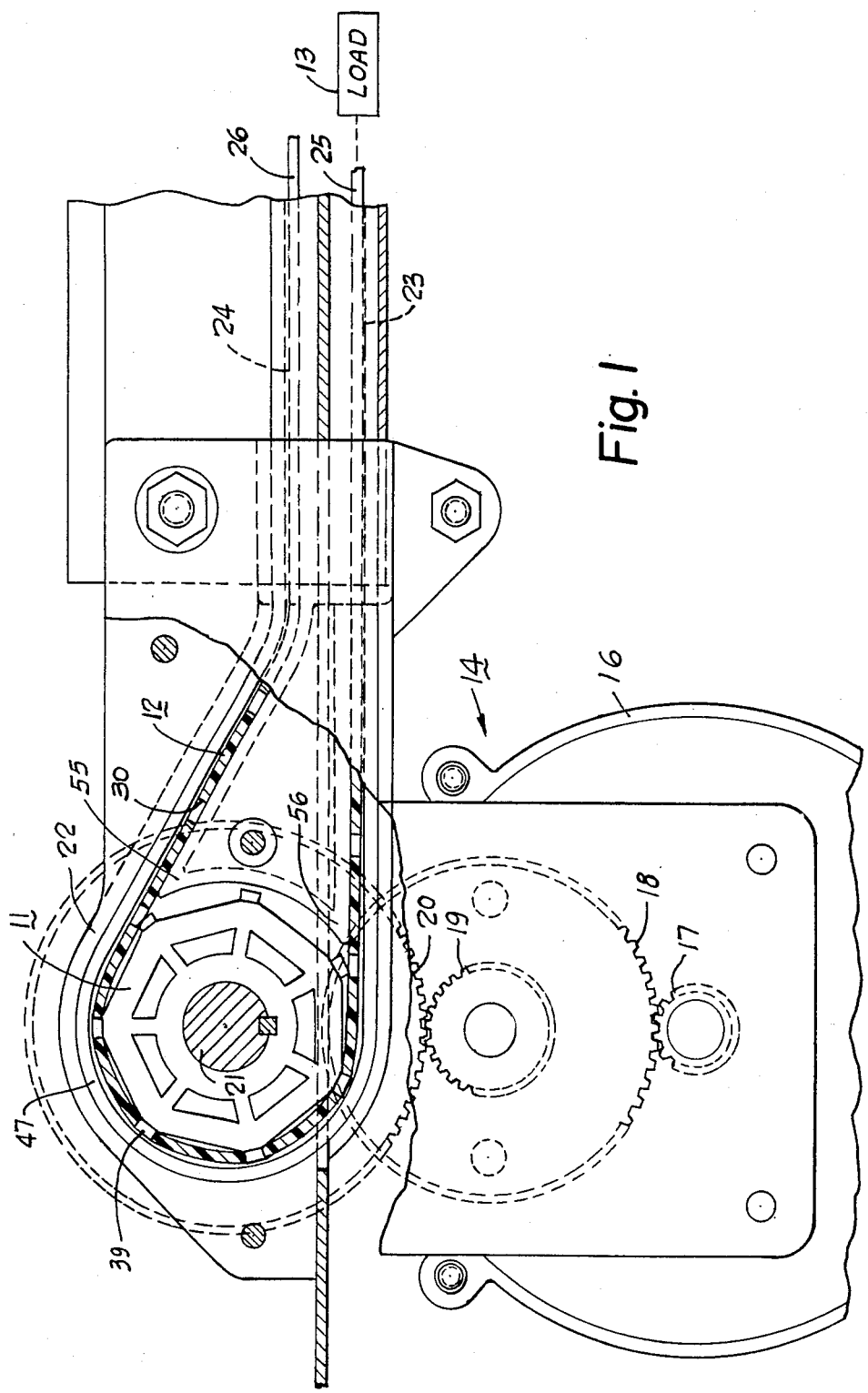
FIG. 1 is an elevational view, partly in section, of a sprocket and tape combination according to the invention.
Figure 2:
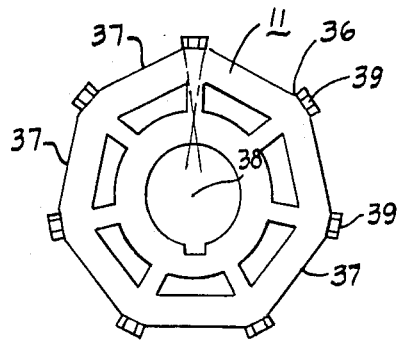
FIG. 2 is an elevational view of the sprocket of the invention.
Figure 3:
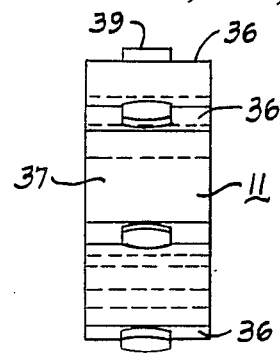
FIG. 3 is a side view of the sprocket of FIG. 2.

FIGS. 1 to 5 illustrate the combination of a sprocket 11 and a unitary flexible tape 12. The sprocket 11 may be a drive sprocket so that rotation thereof drives the tape longitudinally and moves a load 13. This may be one of many forms of loads, for example, a closure as being a gate or garage door, as disclosed in U.S. Pat. No. 4,520,684. FIG. 1 illustrates that the drive sprocket 11 and tape 12 are part of a closure operator 14, with the load 13 being the closure. The closure operator 14 includes an electric motor 16 which drives through a pinion 17, a gear 18, a pinion 19, and a gear 20 to rotate a shaft 21 journaled in a sprocket housing 22. The drive sprocket 11 is fixed to this shaft 21 to rotate therewith, and hence be driven by the electric motor 16.

The sprocket housing 22 provides a lower guide channel 23 and an upper guide channel 24 for a lower run 25 and an upper run 26 of the tape 12. By this means, the lower run 25 of the tape is guided in its reciprocation of the load 13.

The tape 12 has a series of apertures 30 which extend into the thickness of the tape from the inner surface 31, and in this preferred embodiment extend completely through the tape. These apertures are aligned along the length of the tape and, in this preferred embodiment, are aligned centrally of the tape. The tape 12 has web areas 32 between longitudinally adjacent apertures 30, and has at least one connecting area 33 laterally adjacent each aperture connecting longitudinally adjacent web areas 32. In the preferred embodiment thereof, there are two such connecting areas 33, one on each side of the respective apertures.

Figure 5:
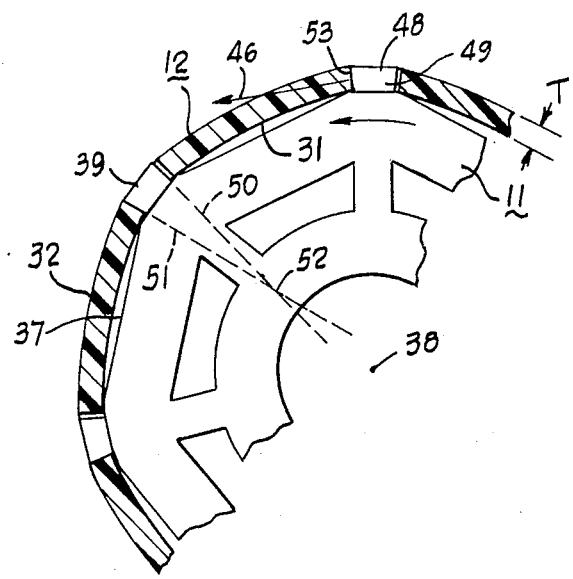
FIG. 5 is an enlarged, partial view of the sprocket and tape combination, with the tape in longitudinal section.
Figure 4:
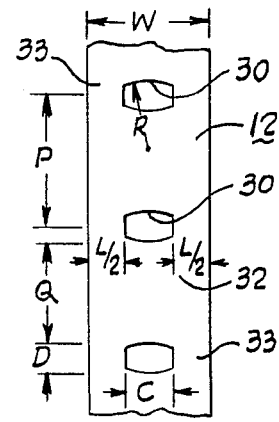
FIG. 4 is a plan view of the tape utilized with the sprocket of FIGS. 2 and 3.

The sprocket 11 has a given plurality of engagement shoulders 36 around the periphery of the sprocket, and these engagement shoulders are adapted to engage the tape connecting areas 33. In the sprocket shown in FIGS. 2 and 3, there are seven such engagement shoulders, or really seven pairs of engagement shoulders. The sprocket 11 has sprocket surfaces 37 which are equal in number to the number of engagement shoulders, and these sprocket surfaces alternate around the periphery with the engagement shoulders. The sprocket has a given radius from the axis 38 thereof to each engagement shoulder 36, and all these radii are equal. A generally radially extending tooth 39 is mounted on each engagement shoulder and is adapted to engage respective apertures 30 in the tape 12. As shown in FIG. 1, the tape is adapted to wrap around a part of the periphery of the sprocket 11 to engage a plurality of teeth, and in the preferred embodiment, it wraps around about 210 degrees of the periphery to engage four of the seven teeth. The sprocket surfaces 37 are disposed radially inwardly from the imaginary circular arc in which lie all of the engagement shoulders. As shown in FIGS. 4 and 5, this permits the tape to bend more at the connecting areas 33 than at the web areas 32.

Figure 6:
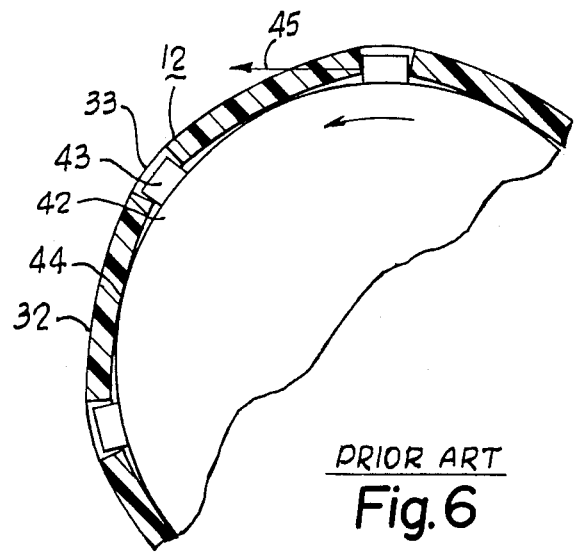
FIG. 6 is an enlarged, partial elevational view of the prior art sprocket and tape combination, with the tape in longitudinal section.

The present invention is an improvement over the prior art construction shown in FIG. 6, wherein the identical tape was used with a sprocket 42 with a circular arc periphery, and generally radially directed, parallel-sided teeth 43. In such case, the midpoints 44 of the sprocket surfaces between longitudinally adjacent teeth 43 pushed outwardly against the web area 32 of the tape 12, and since this web area 32 did not bend nearly as much as the connecting areas 33, the tape at these connecting areas tended to be forced radially off the respective tooth 43. As will be noted in FIG. 1, the sprocket housing 22 has an outer enveloping shield 47 which covers the entire width of the tape 12 and keeps the tape on the sprocket. However, with the prior art construction, the tape outer surface was forced frictionally against the inner surface of this enveloping shield 47. This resulted in increased drag, with decreased force to the load 13. Also, it will be seen from FIG. 6 that the teeth had substantially parallel edges, as viewed in FIG. 6, and these were cooperating with an aperture which, due to the pronounced bending at the connecting areas 33, was wider at the top than at the bottom next to the sprocket. This meant that the tooth itself gave a component of force tending to push the tape off the respective tooth, as shown by force arrow 45. The combined effect of these two phenomena meant that a particular tooth was often engaging only about half the thickness of the tape, and as a result the tape could be much more easily deformed or torn at its point of engagement with the tooth. This was especially true under heavy loads, such as the commencement of the upward movement of a garage door. Further, such heavy load starting always occurred at the same aperture on the tape, for eventual wear at this point.

The present invention shown in FIG. 5 precludes these two different means of damage to the tape. The first improvement over the prior art is that the sprocket surfaces 37 are spaced inwardly from the circular arc which defines the seven engagement shoulders 36. This permits the tape 12 to bend considerably more at the connecting areas 33 than at the web areas 32. The dimensions of the tape 12 are shown in Table A.

TABLE A

| W | T | C | D | Q | L | P | R |
|---|---|---|---|---|---|---|---|
| (in inches) | | | | | | | |

TABLE A-continued

| .800 | .082 | .330 | .190 | .658 | .470 | .848 | .320 |
|---|---|---|---|---|---|---|---|
| Area in Square Inches C.D. | | W − C / Q | | W − C / C | | Web Shear Strength | Aperture Percent Area |
| .0528 | | .714 | | 1.424 | | 600 psi | 7.78% |

It will be noted that the apertures 30 remove about 41% of the total width of the tape. Hence, with only about 59% of the tape remaining at the connecting areas 33, the tape has much more tendency to bend at these areas than at the web areas 32. The inwardly positioned sprocket surfaces 37 permit this radially inward positioning of the web areas 32. By this means, the tape at the connecting areas 33 is actually in engagement with the engagement shoulders 36, rather than being spaced radially outwardly from the sprocket, as shown in the prior art (FIG. 6).

The second feature of the present invention which precludes damage to the tape and establishes greater torque transmitted to the tape is the fact that each tooth is wider, in the peripheral direction of the sprocket, at the radially outer end 48 of the tooth than at the inner end 49 thereof adjacent the sprocket 11. As shown in FIG. 5, the construction line 50 extended from on side of the tooth intersects the construction line 51 extended from the other side of the tooth at a position 52 radially outward from the axis 38. By this means, the face 53 of the tooth which is in engagement with the aperture surface for counterclockwise rotational direction will be substantially perpendicular to a tangent to the tape at the edge of the aperture, as shown by force arrow 46. By this means, the entire radial dimension of the tooth at the face 53 is in substantial engagement with the surface of the tape aperture 30. This promotes maximum torque transmitted from the sprocket 11 to the tape 12 without any tendency to force the tape outwardly against the enveloping shield 47, and hence a maximum torque or force is delivered to the load 13. The sprocket housing has stripper teeth 55 and 56, to positively pull the tape off the sprocket teeth 39 despite the larger size at the outer end 48 of each tooth.

In the construction of the sprocket 11, the engagement shoulders 36 are short arcs on a given radius from the axis 38. Alternatively, they may be at a slightly smaller radius to conform to the tape as it normally attempts to bend at the connecting areas 33. From FIG. 5, it will be noted that the inner surface 31 of the tape is spaced from the sprocket surfaces 37 and these surfaces may be slightly convex or slightly concave, or even spoked, yet they are shown as planar to establish a generally polygonal shaped sprocket 11.

FIG. 1 shows that the sprocket and tape combination may be used in an environment wherein the motor 16 may be reversible to drive the tape in two opposite directions. With the load 13 connected to the bottom run 25 of the tape, this establishes the tape in tension for clockwise rotation of the sprocket and in compression for counterclockwise rotation of the sprocket. The tape is relatively stiff, due to its dimensions shown in Table A, and due to the fact that the preferred type of tape is an oriented, elastomeric polymer tape. Such tape is available commercially from the DuPont Company. As shown in Table A, the tape thickness is 0.082 inch, which is about 9% of the given radius of 0.88" of the sprocket 11. This is a relatively sharp bending of the tape in wrapping around the part of the periphery of the sprocket relative to the thickness of the tape, and is why the tape apertures spread open at the outer surface of the tape relative to the inner surface of the tape. Accordingly, it will be seen that the tape has a thickness which is a relatively large fraction of the given radius of the sprocket to establish the tape as being relatively stiff against bending. The present invention is of particular importance where the tape has a thickness of at least 5% of the given radius of the sprocket, and wherein the apertures have a width which is a substantial portion of the total width of the tape, e.g., at least 40% of the total width of the tape.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A sprocket and flexible tape combination, comprising:
    said tape having a series of apertures into the thickness thereof from the inner surface thereof and aligned along the length thereof;
    said tape having web areas between longitudinally adjacent apertures and having at least one connecting area laterally adjacent each apperture connecting longitudinally adjacent web areas;
    said sprocket having a given plurality of engagement shoulders around the periphery adapted to engage said tape connecting areas;
    sprocket surfaces equal in number to said plurality of engagement shoulders and alternating in a longitudinal direction with said engagement shoulders around the periphery of said sprocket;
    said sprocket having a given radius from the axis thereof to said given plurality of engagement shoulders;
    a generally radially extending tooth mounted on each engagement shoulder and adapted to engage respective apertures in the flexible tape;
    said tape adapted to wrap around a part of the periphery of the sprocket to engage a plurality of said teeth;
    said given plurality of sprocket surfaces established in a position radially inwardly from the circular arc of said engagement shoulders from said axis to establish said tape as bent more at said connecting areas than at said web areas; and
    the inner surface of said tape being spaced from said sprocket surfaces.

2. A sprocket and flexible tape combination as set forth in claim 1, wherein said sprocket engagement shoulders are short arcs having said given radius.

3. A sprocket and flexible tape combination as set forth in claim 1, wherein said sprocket surfaces are substantially planar.

4. A sprocket and flexible tape combination as set forth in claim 1, wherein the inner surface of said tape is in engagement with said engagement shoulders in said part of the periphery around which the tape is wrapped.

5. A sprocket and flexible tape combination as set forth in claim 1, wherein the tape is wrapped around more than 180° of the periphery of said sprocket.

6. A sprocket and flexible tape combination as set forth in claim 1, wherein said sprocket is a drive sprocket adapted to be driven bidirectionally to impose alternative tension and compression forces on said tape.

7. A sprocket and flexible tape combination as set forth in claim 1, wherein said apertures are aligned centrally along the length of the tape and there are two connecting areas one each on opposite lateral sides of the respective aperture.

8. A sprocket and flexible tape combination as set forth in claim 1, wherein said flexible tape is an oriented elastomeric polymer tape.

9. A sprocket and flexible tape combination as set forth in claim 1, wherein said tape has a thickness which is a relatively large fraction of said given radius so that the tape is relatively stiff.

10. A sprocket and flexible tape combination as set forth in claim 1, wherein said tape has a thickness at least five percent of said given radius of said sprocket.

11. A sprocket and flexible tape combination as set forth in claim 1, wherein said apertures have a width of at least forty percent of the total width of the tape.

12. A sprocket and flexible tape combination as set forth in claim 1, wherein said sprocket is a drive sprocket adapted to drive a load via the tape with the tape stressed in at least one of tension and compression.

13. A sprocket and flexible tape combination, comprising:
    said tape having a series of apertures into the thickness thereof from the inner surface thereof;
    said tape having web areas between longitudinally adjacent apertures and having at least one connecting area laterally adjacent each aperture connecting longitudinally adjacent web areas;
    said sprocket having a given plurality of engagement shoulders around the periphery adapted to engage said tape connecting areas;
    sprocket surfaces alternating in a longitudinal direction with said engagement shoulders around the periphery of said sprocket;
    a tooth mounted on each engagement shoulder and adapted to engage respective apertures in the flexible tape;
    said tape adapted to wrap around a part of the periphery of the sprocket to engage a plurality of said teeth;
    said given plurality of sprocket surfaces established in a position radially inwardly from the circular arc of said engagement shoulders from the axis of the sprocket to establish said tape as bent more at said connecting areas than at said web areas; and
    each tooth being wider, in the peripheral direction of the sprocket, at the radially outer end thereof than at the inner end adjacent a sprocket engagement shoulder to enhance contact of the drive tooth with the entire thickness of the tape at the tape aperture.

14. A sprocket and flexible tape combination as set forth in claim 13, wherein the respective tooth is substantially perpendicular to a tangent to the tape at the edge of the aperture in engagement with that tooth.

15. A sprocket and flexible tape combination, comprising:
    said tape having a series of apertures into the thickness thereof from the inner surface thereof;

said tape having web areas between longitudinally adjacent apertures and having at least one connecting area laterally adjacent each aperture connecting longitudinally adjacent web areas;

said sprocket having a given plurality of engagement shoulders around the periphery adapted to engage said tape connecting areas;

sprocket surfaces alternating in a longitudinal direction with said engagement shoulders around the periphery of said sprocket;

a generally radially extending tooth mounted on at least some of said engagement shoulders and adapted to engage respective apertures in the flexible tape;

said tape adapted to wrap around a part of the periphery of the sprocket to engage a plurality of said teeth;

said given plurality of sprocket surfaces established in a position radially inwardly from the circular arc of said engagement shoulders from said axis to establish said tape as bent more at said connecting areas than at said web areas; and said tape being bent so much in wrapping around said part of the sprocket that the apertures in the tape are wider at the outer surface than at the inner surface thereof.

* * * * *